J. P. SHUKIS.
MAGAZINE PLATE HOLDER FOR CAMERAS.
APPLICATION FILED MAR. 14, 1912.
1,033,834.
Patented July 30, 1912.
5 SHEETS—SHEET 5.
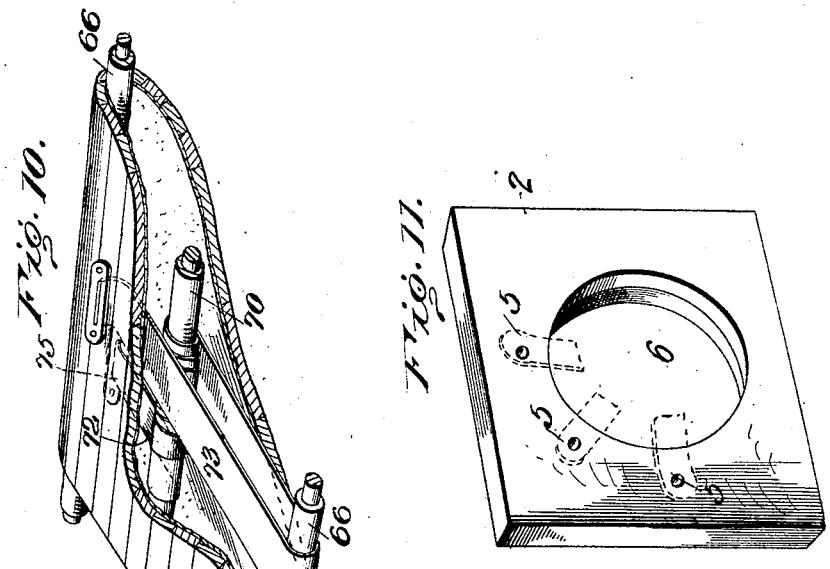
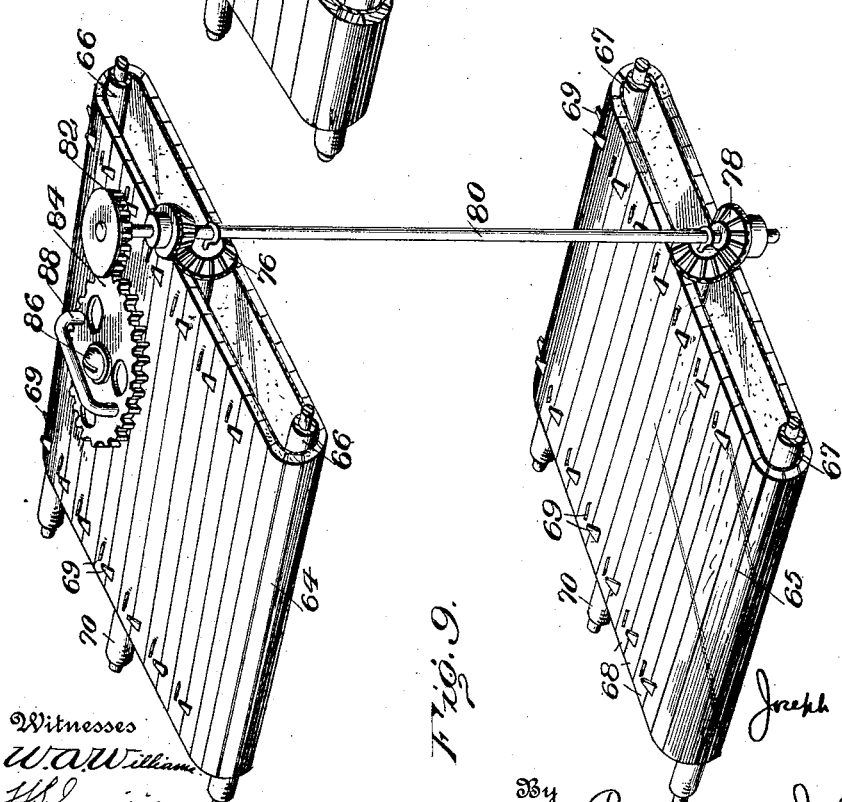

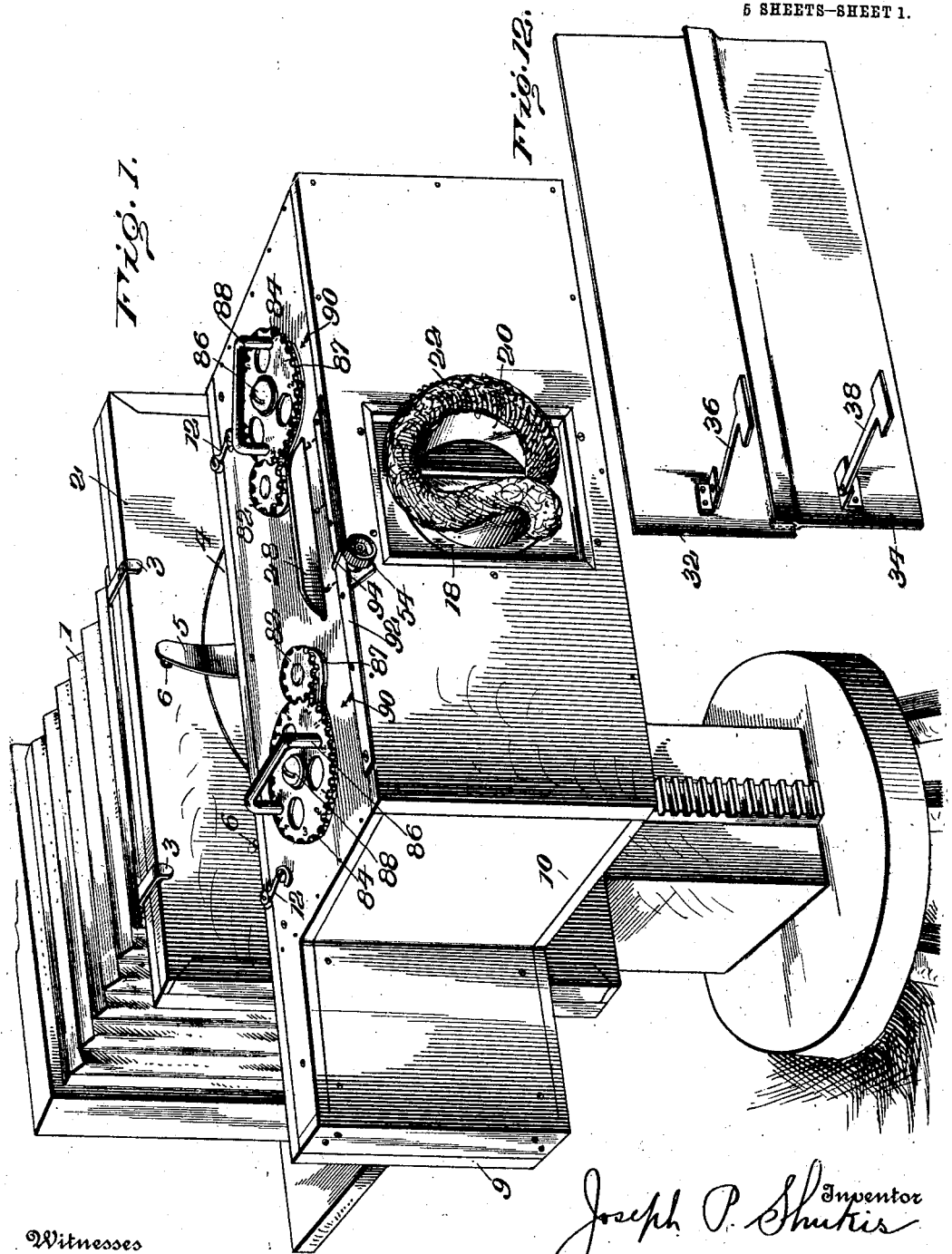

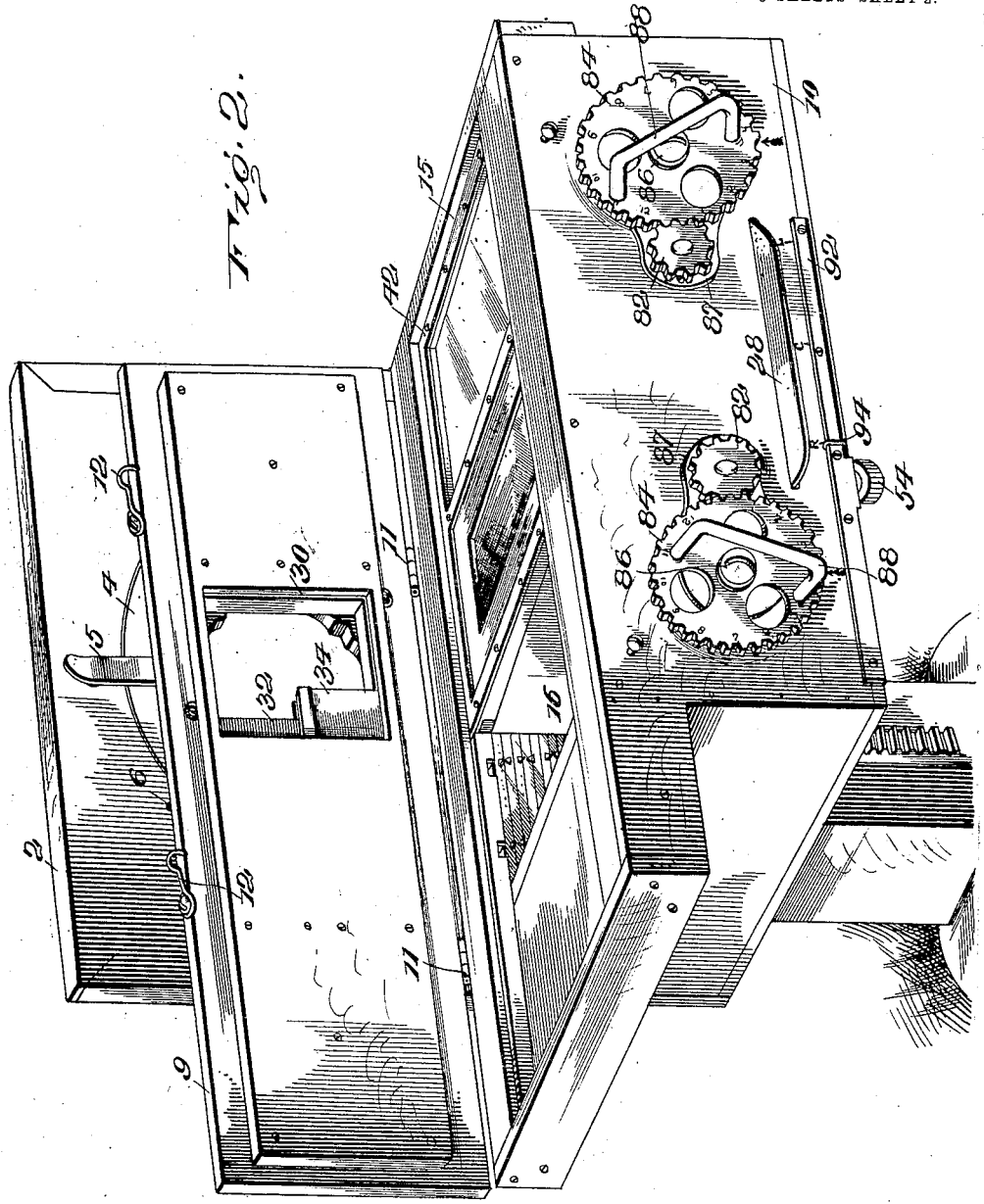

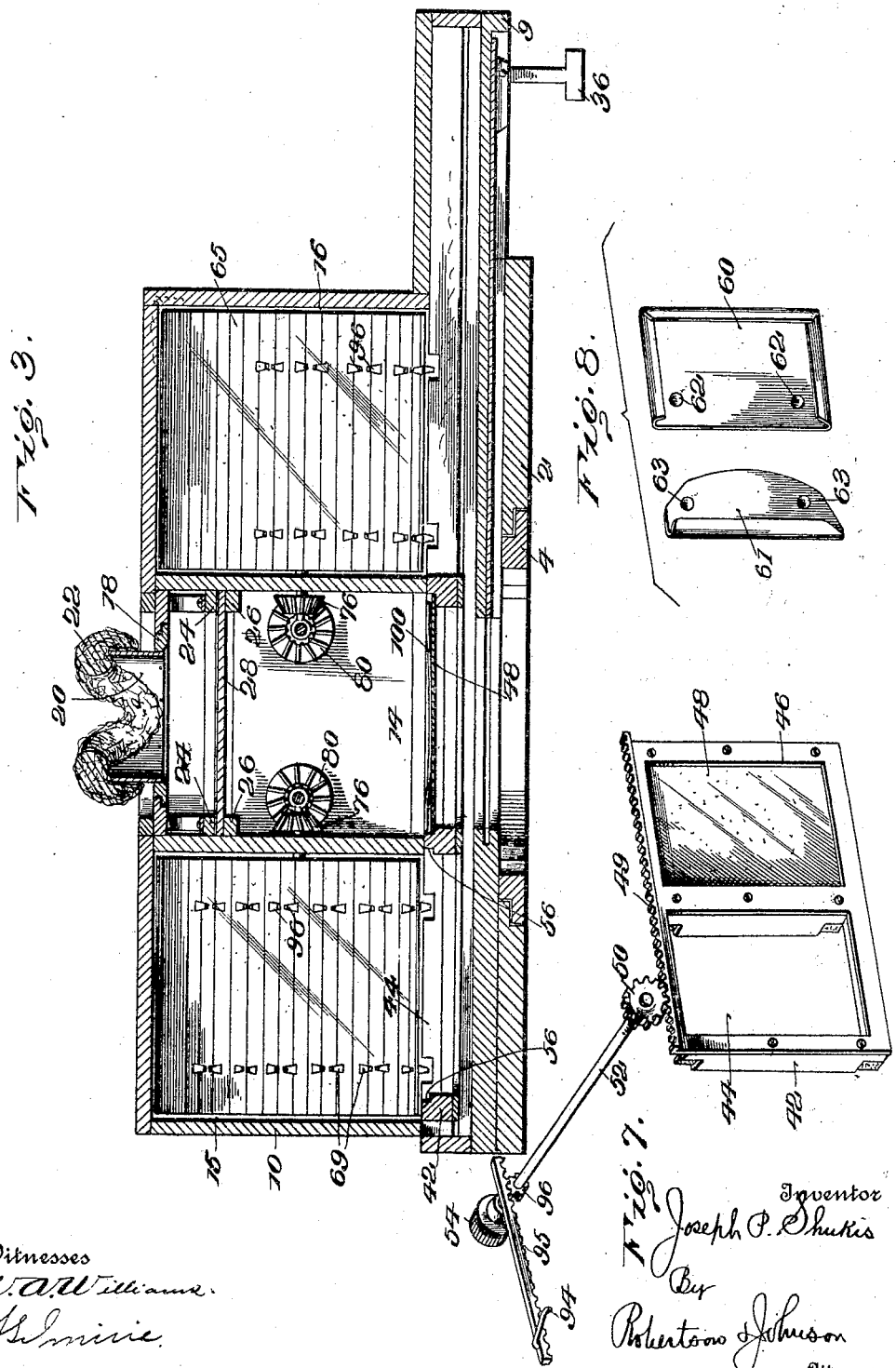

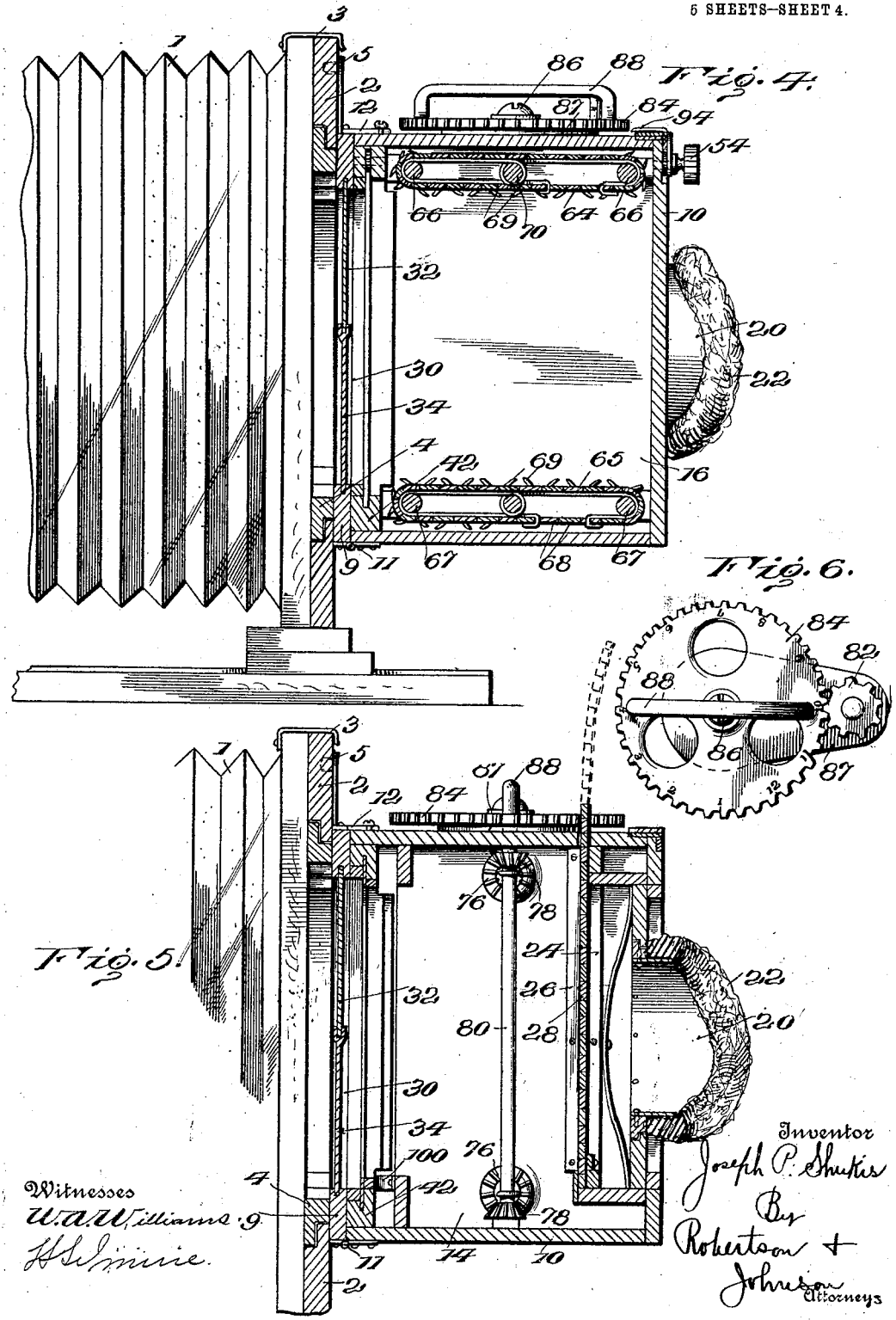

UNITED STATES PATENT OFFICE.

JOSEPH P. SHUKIS, OF WILKES-BARRE, PENNSYLVANIA.

MAGAZINE PLATE-HOLDER FOR CAMERAS.

1,033,834.

Specification of Letters Patent.  Patented July 30, 1912.

Application filed March 14, 1912. Serial No. 683,669.

*To all whom it may concern:*

Be it known that I, JOSEPH P. SHUKIS, a Lithuanian and subject of the Czar of Russia, now residing in Wilkes-Barre, in the county of Luzerne and State of Pennsylvania, United States of America, have invented certain new and useful Improvements in Magazine Plate-Holders for Cameras, of which the following is a specification.

This invention relates to new and useful improvements in plateholding attachments for cameras and the object of the invention is to provide an attachment which may be loaded with a dozen or as many plates as may be desired, and as these plates are exposed, they may be stored one at a time in the attachment, thus avoiding the necessity of using a number of separate plate holders which have to be brought to and from the dark room.

In the preferable embodiment of my invention I provide an attachment whereby there are two storage chambers on opposite sides of a focusing opening so that after the camera is focused, one of the plates may be moved edgewise into the position for exposure, and after the exposure is made, the plate is moved to the other side of the exposure opening for storage.

The invention consists of an attachment of this character hereinafter described and claimed.

In the drawings accompanying and forming part hereof, which it should be understood represent the preferable though not necessary embodiment of my invention: Figure 1 is a perspective view of a camera having my invention attached thereto. Fig. 2 is a perspective view of the attachment thrown open, so that the parts may be better seen. Fig. 3 is a horizontal section of my attachment. Fig. 4 is a sectional view through the storage chamber. Fig. 5 is a vertical section on a line passing through the exposure opening. Fig. 6 is a top plan view of the device for rotating the plate transferring mechanism. Fig. 7 is a perspective view of the plate transferring slide and its operating gear. Fig. 8 is a perspective view of one of the plate holders. Fig. 9 is a perspective view of the mechanism for shifting the plates within the storage chamber. Fig. 10 is a perspective view, with parts broken away, of one of the sectional plate shifting devices. Fig. 11 is a perspective view of part of the frame. Fig. 12 is a perspective view of a pair of slides.

Referring now to the details of the drawings by numerals—1 designates a camera of any ordinary construction to which my attachment may be secured, the attachment being secured in position in place of the ordinary plate holders now so commonly employed. To this end I provide a frame 2 which is secured to the camera by the usual spring clips 3 so that the attachment may be as readily secured to the camera as the ordinary plate holder, and in the same manner.

The aforesaid frame 2 has a large circular opening within which is secured a rotatable member 4 which permits the plate carrying box, hereinafter described, to be rotated with respect to the frame 2, a spring clip 5 being employed which has a projection adapted to fit within one of several openings 6 in the frame 2, in order to hold the plate holding device in the proper position with respect to the aforesaid frame 2.

The aforesaid rotatable member 4 is secured to the rear end 9 of a housing or box-like structure 10, the member 9 being adapted to rotate with the rotatable member 4 so that the housing or box-like structure 10 may be held by the spring clip 5 at the desired angles with respect to the camera, by means of the aforesaid spring clip 5.

The housing or box-like structure 10 is hinged at 11 to the aforesaid member 9, hooks or equivalent means 12 being employed to lock said housing or box-like structure to the member 9 in the position shown in Figs. 4 and 5; the box-like structure being capable of opening, when the hooks 12 are released, as illustrated in Fig. 2. Said housing or box-like structure is rather longer than the camera is wide as will be seen from Figs. 1 and 2, and it contains three openings, first, an exposure opening 14 illustrated in Fig. 3; second, a loading chamber 15 and third a storage chamber 16, the said exposure chamber being between the loading and storage chambers.

The exposure chamber 14, as shown in Fig. 3, has at its front end a rotatable member 18 projecting from which is a hood 20 shaped particularly for the insertion of the face of the operator, the edge of said hood being provided with a pad or similar device 22. This structure permits the operator to place his face against the hood so that he can properly focus the camera without the use of a focusing cloth; it being understood that when the magazine attachment is turned at right angles, the member 18 may be rotated with respect to the box-like structure 10 so that it will still be in the proper position for focusing. Within the focusing chamber I secure two pairs of guides 24—26 within which works a slide 28 which, when the focusing is being done, may be moved to the position shown in dotted lines in Fig. 5 but after the focusing is finished, said slide may be inserted in the position shown in full lines in Fig. 5 thus effectually shutting off the light which would otherwise pass from the focusing hood 20. I should here mention that at the other end of the focusing chamber there is an opening 30 formed in the member 9 through which the focusing is also done, and within the member 9 are arranged two co-acting slides 32 and 34, one of which works within a groove of the other (see Fig. 11), the construction being such that if a large picture is to be made, both of these slides may be moved so that the opening 30 is of its greatest size but when a picture is to be taken which is one-half the size of said opening, one of these slides may be moved so as to close half of the opening. Or both slides may be moved to close the opening to any desired extent. These slides are provided with pivoted handles 36 and 38 which project through a slot 40 in the member 4 and it will be understood that the slides may be operated by moving the handles 36 and 38 in a manner well understood.

Located between the loading and storage chambers and the member 9, I arrange a plate transferring slide 42 shown in perspective view in Fig. 7; this slide being shown in operated position in Figs. 2, 3, 4 and 5. The slide 42 is provided with two rectangular openings 44 and 46, as indicated in Fig. 7, one of these (46) having a ground glass 48 secured therein, and the other (44) being arranged to receive a plate holder as will be hereinafter described. This slide 42 is provided with a rack 49 with which co-acts a pinion 50 fixed to a shaft 52, one end of which passes through the box-like structure 10 and has on its end a thumb wheel 54 by means of which the shaft may be turned to rotate its gear 50 to move the plate holding slide 42 back and forth within the recesses contained between the box-like structure and the member 9. It may be further said that when the operator moves this slide 42 to the position shown in Fig. 3, the focusing glass 48 is between the loading and storage chambers and opposite the focusing chamber so that if the operator withdraws the slide 28, he may, by looking through the focusing hood 20, properly focus the camera. When the slide is in the position just referred to (see Fig. 3), the opening 44 of the slide 42 is directly opposite the loading chamber 15 so that it is in a position to receive a plate and plate holder as will be hereinafter described. After the focusing has been performed, a plate is transferred from the loading chamber 15 into the slide, said slide having rabbets 56 to receive the same and the operator then moves the thumb wheel 54 to cause said slide 42 with the plate and plate holder fitting within the rabbets 56 to move until the plate within the slide comes opposite the opening 30 in the member 9. The exposure may now be made and after it is made, the operator then again rotates the thumb wheel 54 to move the slide 42 until the plate contained therein is opposite the storage chamber 16, when said plate may be removed in a manner hereinafter described. After the plate has been removed from the slide, the operator again rotates the thumb wheel 54 to move the empty slide 42 back to the position shown in Fig. 3, ready for the camera to be re-focused if necessary and to receive another plate from the loading chamber 15.

In order to move the plates from the loading chamber into the slide 42 and from said slide 42 into the storage chamber 16, I provide mechanism as will now be described. First, however, I would state that the plates are contained in thin metal plate holders 60 shown in Fig. 8, this holder comprising a flanged side and ends to receive the plate and having one removable flanged portion 61 to close the open side of the holder, the holder proper (60) having indentations 62 into which fit projections 63 in the part 61, to lock the part 60 to the part 61. The chambers 15 and 16 have at the top and bottom a sectional rolling frame 64 and 65 (see Fig. 4), these sectional frames being supported at the top and bottom by means of cross bars 66 and 67. The said sectional frames are provided with slats 68 having projections 69 projecting therefrom, the spaces between the projections of the adjacent slats being just sufficient to retain a plate holder between them. In order that these sectional frames 64 and 65 may be operated at the proper times, I employ a shaft 70 suitably journaled in the top and bottom of each chamber 15 and 16, the shaft 70 passing through the sectional frames 64 and 65. To this shaft 70 are secured two metallic ribbons 72 and 73, the ribbon 72 having one end secured to the shaft 70 and its free end 75 being secured to one of the slats, and the ribbon 73 having one end also secured to the shaft 70 and its other end passing around the rod 66 and then back over the shaft 70 and secured to one of the slats near the opposite rod 66 as shown in dotted lines in Fig. 10. The construction is such that when the shaft 70 is rotated, the ribbons are so moved with respect to the shaft 70 that the sectional frames 64 and 65 are given the proper movement, one ribbon winding up on the shaft 70 as the other unwinds. Each of the shafts 70 has a bevel gear 76 upon one end and the bevel gears of the two companion frames 64 and 65 (see Fig. 9) are in mesh with two similar bevel gears 78 fixed to a common driving rod 80 suitably journaled in the box like structure or casing 10. The free end of the driving rod 80 passes through the box-like structure or casing 10 and has a gear 82 secured to its exposed end. It is obvious that the rotation of this rod 80 will give the proper movement to the sectional frames 64 and 65 and said driving rod may be operated in any desired manner, but I prefer the construction shown in the drawings wherein I employ a larger gear 84 suitably journaled to a pin 86 projecting from a metal plate 87 secured to the upper side of the boxlike structure or casing 10, the gear 84 meshing with the gear 82 on the driving rod 80.

In order that the larger gear 84 may be properly rotated, I secure to it a handle 88. I might further add that in order to make it plain just how the plates are being moved, the larger gear 84 is provided with numbers, each number designating a plate, and as these numbers come opposite the arrows 90 shown in Fig. 1, the operator can tell just the position of the various plates. And in order to determine the location of the slide 42 which shifts the plate holder from the loading chamber to the storage chamber, I employ an indicator 92 having three marks "R", "C" and "L" thereon. Co-acting with these is a finger 94 which projects through the casing and is connected with a rack 95 (see Fig. 7) which engages with a pinion 96 on the shaft 52 which has been hereinbefore described as giving movement to the sliding frame 42, to carry the plates from the loading chamber to the storage chamber. The construction is such that when the hand wheel 54 is operated to move the slide 42 through its gear 50, the small gear 96 simultaneously moves the rack 95 so that the finger 94 will indicate by means of the characters "R", "C" and "L" the exact location of the plate holding slide 42. Thus, when the finger 94 is opposite the "R", the plate transferring slide 42 is in the proper position to receive a plate from the loading chamber on the right hand side of the attachment looking at Fig. 1. When the hand wheel 54 has been rotated so that the finger 94 is opposite the character "C", the plate holding slide has been moved to the position where the plate carried thereby will be in position to be exposed. Finally, when the finger 94 has been moved opposite the character "L" the plate transferring slide has been moved to the extreme left, looking at Fig. 1, so that the plate carried by the slide 42 is in the position to be moved therefrom into the storage chamber.

The operation is as follows: Assuming that the attachment is entirely empty, the operator, in a dark room, of course, after loading the desired number of plates into plate holders such as shown in Fig. 8, places said loaded plate holders, one at a time, between the projections on the sectional frames in the loading chamber 15, the operator turning the handle 88 of said loading chamber the proper distance to remove the plates one at a time into said chamber. After the loading chamber is entirely filled with plates, the number "1" on the large gear 84 will be opposite the arrow 90 on the right hand side as indicated in Fig. 1. The device is now locked in a closed position by means of the hooks 12 and is ready to be taken from the dark room and attached to the end of a camera in the manner in which plate holders are ordinarily secured to cameras. After the attachment has been secured to the camera and it is desired to focus the camera, assuming that the plate transferring slide 42 is in the proper position to have the ground glass 48 in the focusing position, the operator moves the vertical sectional slide 28 from the position shown in full lines in Fig. 5 to the position shown in dotted lines in the said figure, and if the slides 32 and 34 have been opened to the proper positions, the operator may properly focus the camera for exposure. After the focusing has been properly attended to, the operator inserts the slide 28 in the position shown in full lines in Fig. 5 and then rotates the right hand handle 88 until the figure "2" moves opposite the arrow 90. This movement of the handle 88 through the gears 82 and 84 will cause the first loaded plate holder to be projected into the rabbets 56 of the plate transferring slide 42. The operator now rotates the thumb wheel 54 until the finger 94 is opposite the character "C" which thus indicates that the plate transferring slide has moved its plate to the position in which the exposure is to be made. After the exposure has been made the operator again rotates the thumb wheel 54 until the finger 94 is opposite the character "L." By this movement the plate transferring slide has been moved until the exposed plate is opposite the loading chamber. Then the operator moves the left hand handle 88 until the figure "1" comes opposite the arrow 90 at the left hand side of Fig. 1. This movement of the handle 88 through its gears 82 and 84 rotates the rod 80 to cause the sectional frames to move so that the first set of pins 65 will grasp the loaded plate holder and move it from out of the rabbets 56 of the slide 42 into the loading chamber. The operator again rotates the thumb wheel 54 until the finger 94 moves from the character "L" across to the character "R" when the operation may be repeated until all the plates have been transferred, exposed, and stored in the storage chamber. I should here mention that while the plate is in the position for exposure, a spring 100, shown in Fig. 3, prevents the plate holder from falling back into the exposure opening.

From the foregoing and accompanying drawings it will be seen that I have invented a magazine plate holding attachment for cameras that is capable of being loaded with a number of plates and then easily attached to the camera and the plates exposed, and after exposure being moved within the storage chamber, all these movements being caused by manipulations by the operator of parts located on the exterior of the attachment.

It is obvious that my invention is not limited to the embodiment illustrated, and I therefore refer to the appended claims in order that the scope of the invention may be ascertained.

What I claim as my invention is:

1. In a magazine plate holder, a box-like frame having an exposure opening through which the focusing may be done, loading and storage chambers on opposite sides of said exposure opening, and a slide adapted to receive and transfer a plate from the loading chamber to the storage chamber, said slide being movable, while containing its plate, from the loading chamber to the storage chamber.

2. In a magazine plate holder, a box-like frame having an exposure opening through which the focusing may be done, loading and storage chambers on opposite sides of said exposure opening, and a slide adapted to receive and transfer a plate from said loading chamber to said storage chamber, said slide having a part through which the exposure may be made when the slide is moved so that said part is opposite said exposure opening.

3. In a magazine plate holder, a box-like frame having an exposure opening, loading and storage chambers on opposite sides of said exposure opening, a slide adapted to receive and transfer a plate from the loading chamber to the storage chamber, said slide being movable, while containing its plate, from the loading chamber to the storage chamber and means operable from the exterior of the box for moving a plate from the loading chamber into said slide.

4. In a magazine plate holder, a box-like frame having an exposure opening, loading and storage chambers on opposite sides of said exposure opening, a slide adapted to receive and transfer a plate from the loading chamber to the storage chamber, said slide being movable, while containing its plate, from the loading chamber to the storage chamber, means operable from the exterior of the box for moving a plate from the loading chamber into said slide, and means operable from the exterior of the box for moving a plate from said slide into the storage chamber.

5. In a magazine plate holder, a box-like frame having an exposure opening, loading and storage chambers on opposite sides of said exposure opening, a slide adapted to receive and transfer a plate from the loading chamber to the storage chamber, said slide being movable, while containing its plate, from the loading chamber to the storage chamber and means operable from the exterior of the box for moving a plate from the loading chamber into said slide, said means comprising a movable frame formed of slats having projections spaced apart substantially the proper width to receive the plate.

6. In a magazine plate holder, a box like frame having an exposure opening, loading and storage chambers on opposite sides of said exposure opening, and a slide adapted to transfer a plate from the loading chamber to the storage chamber, said slide being movable, while containing a plate, from the loading chamber to the storage chamber, and having a ground glass in one portion and a plate receiving aperture in another portion.

7. In a magazine plate holder, a box-like frame having an exposure opening, loading and storage chambers on opposite sides of said exposure opening, a slide adapted to receive and transfer a plate from the loading chamber to the storage chamber, said slide being movable, while containing its plate, from the loading chamber to the storage chamber and a rack and pinion for moving said slide.

8. In a magazine plate holder, a box-like frame having an exposure opening, loading and storage chambers on opposite sides of said exposure opening, a slide adapted to transfer a plate from the loading chamber to the storage chamber, said slide being movable, while containing a plate, from the loading chamber to the storage chamber, and having a ground glass in one portion and a plate receiving aperture in another portion, and a rack and pinion for moving said slide.

9. In a magazine plate holder, a casing having an exposure opening, loading and storage chambers on opposite sides of said exposure opening, plate moving devices within said loading and storage chambers, and means for operating said devices, said means comprising a shaft geared to said devices, the end of the shaft projecting through the frame on the exterior thereof whereby said rod may be rotated to move the frames to shift the plates.

10. In a magazine plate holder, a casing having an exposure opening, loading and storage chambers on opposite sides of said exposure opening, plate moving devices within said loading and storage chambers, means for operating said devices, said means comprising a shaft geared to said devices, the end of the shaft projecting through the frame on the exterior thereof, and gearing on the exterior of said frame for rotating said rod to move the frames and thereby shift the plates.

11. In a magazine plate holder, a casing having an exposure opening, loading and storage chambers on opposite sides of said exposure opening, plate moving devices within said loading and storage chambers, means for operating said devices, said means comprising a shaft geared to said devices, the end of the shaft projecting through the frame on the exterior thereof, a gear on the projecting end of said shaft, and a second gear meshing with the first named gear and having a handle thereon for rotating the same.

12. In a magazine plate holder, a frame having an exposure opening, loading and storage chambers on opposite sides of the exposure opening, plate moving frames located within said loading and storage chambers comprising sections or slats, and means for operating said sectional frames comprising a shaft geared to said frames, the end of the shaft projecting through the frame on the exterior thereof whereby said rod may be rotated to move the frames to shift the plates.

13. In a magazine plate holder, a casing having an exposure opening, loading and storage chambers on opposite sides of said exposure opening, plate moving devices within said chambers comprising a movable sectional frame at the top and bottom of each chamber, and means passing to the exterior of the casing for operating said sectional frames from the exterior of the casing.

14. In a magazine plate holder, a casing having an exposure opening, loading and storage chambers on opposite sides of said exposure opening, plate moving devices within said chambers comprising a movable sectional frame at the top and bottom of each chamber, means passing to the exterior of the casing for operating said sectional frames from the exterior of the casing, and a slide coöperating with said plate moving frames and adapted to receive a plate from the sectional frame in the loading chamber and transfer it to the sectional frame in the storage chamber.

15. In a magazine plate holder, a casing having an exposure opening, loading and storage chambers on opposite sides of said exposure opening, plate moving devices within said chambers comprising a movable sectional frame at the top and bottom of each chamber, rods on which said movable frames are carried, a ribbon connected with each sectional frame for giving the same movement, and a rod in each storage chamber geared to operate the ribbons of both of said frames, the end of said rod passing to the exterior of the casing whereby said rod may be rotated to move the frame to shift the plate.

16. In a magazine plate holder, a casing having an exposure opening, loading and storage chambers on opposite sides of said exposure opening, plate moving devices within said chambers comprising a movable sectional frame at the top and bottom of each chamber, rods on which said movable frames are carried, a ribbon connected with each sectional frame for giving the same movement, a rod in each storage chamber geared to operate the ribbons of both of said frames, the end of said rod passing to the exterior of the casing whereby said rod may be rotated to move the frames to shift the plate, and a slide coöperating with said plate moving frames and adapted to receive a plate from the sectional frame in the loading chamber and transfer it to the sectional frame in the storage chamber.

17. In a magazine plate holder, a casing having an exposure opening, loading and storage chambers on opposite sides of said exposure opening, plate moving devices within said chambers comprising a movable sectional frame at the top and bottom of each chamber, rods on which said movable frames are carried, a ribbon connected with each sectional frame for giving the same movement, a rod connected with said ribbon, and an operating rod in each storage chamber geared to the rods of both of said frames, the end of said operating rod passing to the exterior of the casing whereby said rod may be rotated to move the frames to shift the plates.

18. In a magazine plate holder, a casing having an exposure opening, loading and storage chambers on opposite sides of said exposure opening, plate moving devices within said chambers comprising a movable sectional frame at the top and bottom of each chamber, rods on which said movable frames are carried, a ribbon connected with each sectional frame for giving the same movement, a rod connected with said ribbon, an operating rod in each storage chamber geared to the rods of both of said frames, the end of said operating rod passing to the exterior of the casing whereby said rod may be rotated to move the frames to shift the plates, and a slide coöperating with said plate moving frames and adapted to receive a plate from the sectional frame in the loading chamber and transfer it to the sectional frame in the storage chamber.

19. In a magazine plate holder, a casing having an exposure opening, loading and storage chambers on opposite sides of said exposure opening, plate moving devices within said chambers comprising a movable sectional frame at the top and bottom of each chamber, pins projecting from the sections of said frame adapted to receive and hold said holders, and means passing to the exterior of the casing for operating said sectional frames from the exterior of the casing.

20. In a magazine plate holder, a casing having an exposure opening, loading and storage chambers on opposite sides of said exposure opening, and said casing being rotatably secured to a frame, whereby the casing with its loading and storage chambers may be rotated with respect to said frame.

21. In a magazine plate holder, a casing having an exposure opening, loading and storage chambers on opposite sides of said exposure opening, said casing being rotatably secured to a frame, whereby the casing with its loading and storage chambers may be rotated with respect to said frame, and a spring clip for holding the casing in its adjusted positions.

22. In a device of the character described, a casing having an exposure opening, loading and storage chambers on opposite sides of said exposure opening, a plate transferring slide, movable, while containing a plate, from the loading chamber to the storage chamber, means for operating said slide and an indicator for showing the position of the slide.

23. In a device of the character described, a casing having an exposure opening, loading and storage chambers on opposite sides of said exposure opening, a plate transferring slide, movable, while containing a plate, from the loading chamber to the storage chamber, a hand wheel and coöperating parts for moving said slide, and an indicator for showing the position of the slide.

24. In a device of the character described, a casing having an exposure opening, loading and storage chambers on opposite sides of said exposure opening, a plate transferring slide, a hand wheel and coöperating parts for moving said slide, and a moving indicator and three index marks with which said moving indicator coöperates to indicate the three positions into which the aforesaid slide may be moved.

In testimony whereof I affix my signature in presence of two witnesses.

JOSEPH P. SHUKIS.

Witnesses:
GEORGE J. RITCHIE,
EDNA P. HAUPT.